Sept. 21, 1943.  G. B. ZIMMERMAN  2,329,970
REACTION VESSEL
Filed Feb. 11, 1942

INVENTOR
GORDON B. ZIMMERMAN
BY
ATTORNEY

Patented Sept. 21, 1943

2,329,970

UNITED STATES PATENT OFFICE 2,329,970

REACTION VESSEL

Gordon B. Zimmerman, Chicago, Ill., assignor to Universal Oil Products Company, Chicago, Ill., a corporation of Delaware Application February 11, 1942, Serial No. 430,510

7 Claims. (Cl. 23—252)

The invention is directed to an improved form of reaction vessel designed for use in conducting reactions at high temperature and at sub-atmospheric pressure.

Large reaction vessels designed for use at high temperature and substantial super-atmospheric pressure have been widely used in the petroleum industry and in chemical industries generally and are conventionally of cylindrical form with elliptical or semi-elliptical heads and relatively heavy walls designed to withstand the internal pressure and the operating temperature employed. The internal stress to which such vessels are subjected when operated at high super-atmospheric pressure is much greater than the external stress in similar vessels operated at sub-atmospheric pressure, due to the limit of sub-atmospheric pressure obtainable, and the problems encountered in their design are entirely different. Since the unit stress in the walls is never as great as that of vessels operated at high super-atmospheric pressure, the walls may be of much higher gauge construction, but when the vessel is of large diameter the total external pressure exerted thereon will cause the collapse of a thin wall vessel in the absence of provisions to the contrary. Also external pressure exerted against the heads or ends of the vessel may cause it to bulge or buckle when thin wall construction is utilized.

The present invention provides a construction for large reaction vessels for use at sub-atmospheric pressure which permits the use of light wall construction and which obviates collapse, buckling and bulging of the walls. This is accomplished by providing circumferential corrugations in the cylindrical walls to assist them in resisting collapse and by providing longitudinal stiffening ribs disposed circumferentially about the cylindrical wall at spaced points and preferably also extending over the opposite closed ends of the vessel to resist buckling and bulging.

These features are of particular advantage as applied to reaction vessels employed in processes conducted at high temperature since high temperatures greatly weaken ordinary mild steel and other metals conventionally employed in constructing vessels for this class of service. As a further feature of the invention as applied to such processes, the vessel is preferably lined with a suitable heat insulating material which reduces the temperature to which the metal is subjected. The characteristics of the insulating material employed are preferably such that it is not damaged by the reactants and the conversion products. Relatively inert materials suitable for this class of service are known to those familiar with the art and in most instances may comprise the so-called ganister linings which are composed of a cementitious material such as Portland or high alumina cement with an aggregate of crushed firebrick, calcined shale, or clay, exfoliated vermiculite or other granular or fibrous material possessing some insulating qualities.

The features and advantages of the invention will be more apparent with reference to the accompanying diagrammatic drawing and the following description thereof.

In the drawing

Figure 1:
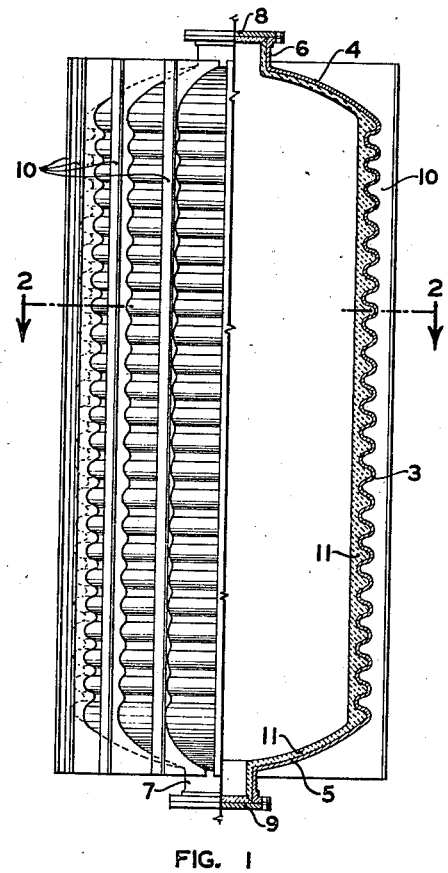
Figure 1 is an elevational view shown partially in section of one specific form of reaction vessel, such as provided by the invention.

Referring to the drawing, the vessel here illustrated comprises the circumferentially corrugated, substantially cylindrical wall 3, to which the elliptical or semi-elliptical heads 4 and 5 are secured at the upper and lower ends of the cylindrical shell by welding, riveting or in any other conventional manner. Upper and lower manway nozzles 6 and 7, respectively, are provided on the upper and lower heads 4 and 5 and are equipped with closure flanges 8 and 9 which may be bolted or otherwise detachably secured to the manway nozzles.

Longitudinal stiffening ribs 10, which in the case illustrated comprise T shaped metal sections, are provided at a plurality of spaced points about the circumference of the shell 3 with the web of each T section extending over the heads 4 and 5 to the manway nozzles 6 and 7. These stiffening ribs preferably follow the contour of the corrugated wall 3 and the heads 4 and 5 and are preferably welded to the latter along their entire length.

Figure 3:
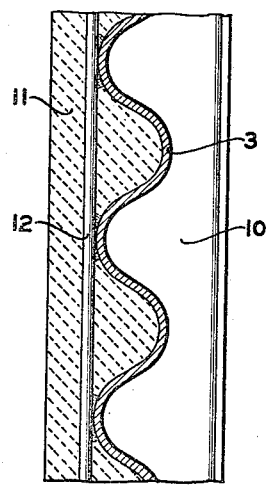
Figure 3 is a fragmentary view illustrating a portion of the corrugated cylindrical wall of the vessel in section with insulating material applied thereto.
Figure 2:
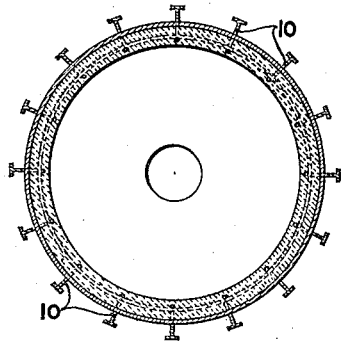
Figure 2 is a cross-sectional view of the same reaction vessel, the section being taken along line 2—2 in Figure 1.

The entire vessel is lined in the case here illustrated with a substantial thickness of heat insulating material indicated at 11. This material substantially fills the corrugations along the cylindrical wall 3 and extends inwardly beyond the inward extremity of the corrugations so that the metal of the shell is covered by a substantial thickness of insulating material. Preferably to assist in retaining the insulating material in place heavy wires or metal rods 12 are disposed longitudinally along the shell at a multiplicity of spaced points about its inner circumference and are welded or otherwise suitably attached to the shell at the inner extremity of the corrugations. These rods are embedded in the insulating material and are also preferably covered by a substantial thickness thereof. Figure 3 shows this construction in enlarged detail. When desired, wire mesh expanded metal lath or the like may be substituted for the rods 12.

I claim:

1. A reaction vessel of relatively large capacity, constructed to withstand sub-atmospheric pressure, having a light outer wall comprising a cylindrical, circumferentially corrugated shell and external stiffening members.

2. A reaction vessel of relatively large capacity, constructed to withstand sub-atmospheric pressure, having a light outer wall comprising a cylindrical, circumferentially corrugated shell and external stiffening members comprising longitudinal ribs disposed at spaced points about the circumference of the shell.

3. A reaction vessel of relatively large capacity, constructed to withstand sub-atmospheric pressure, having a light outer wall comprising a cylindrical, circumferentially corrugated shell, closure heads at opposite ends of the shell, and external stiffening members comprising longitudinal ribs disposed at spaced points about the circumference of the shell.

4. A vessel such as defined in claim 3 wherein said ribs have portions adjacent their opposite ends which extend inwardly from said shell over said heads.

5. A vessel such as defined in claim 3 wherein said heads are of substantially elliptical form and wherein end portions of said ribs extend radially over said heads.

6. A vessel such as defined in claim 3 having a heat-insulating liner covering the inner side of said shell and heads.

7. A vessel such as defined in claim 1 having a substantial thickness of heat-insulating material lining said shell and secured thereto by means comprising elongated, relatively slender metal members embeded in the insulation and secured to the corrugations of the shell at substantially the inner extremity thereof.

GORDON B. ZIMMERMAN.